March 7, 1933. W. C. DENNIS 1,900,229
SAFETY DEVICE FOR PRESSURE SYSTEMS
Filed May 27, 1929
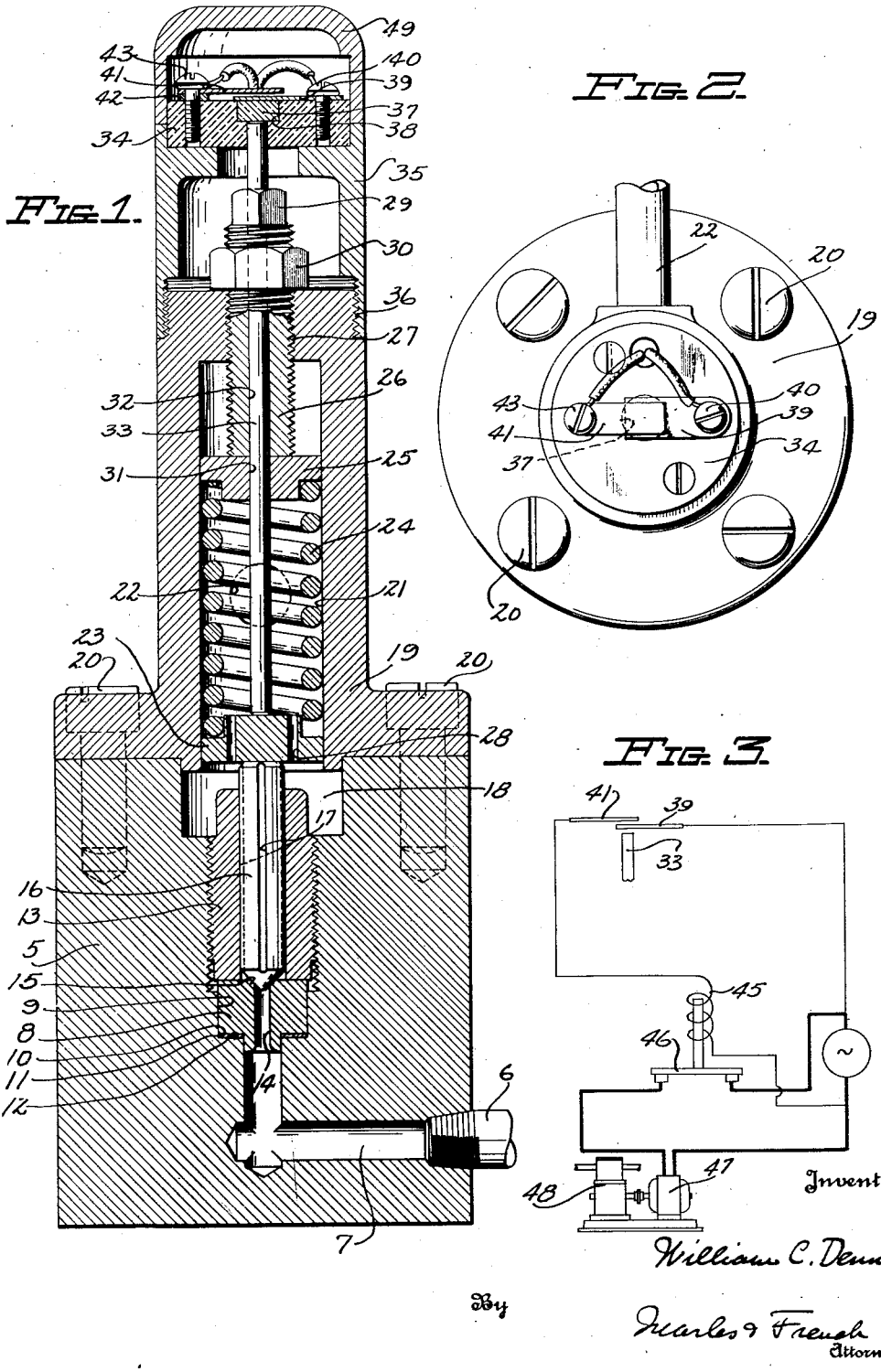

Patented Mar. 7, 1933                                                            1,900,229

UNITED STATES PATENT OFFICE

WILLIAM C. DENNIS, OF MILWAUKEE, WISCONSIN, ASSIGNOR TO CLAYBOURN PROCESS CORPORATION, OF MILWAUKEE, WISCONSIN, A CORPORATION OF WISCONSIN

SAFETY DEVICE FOR PRESSURE SYSTEMS

Application filed May 27, 1929. Serial No. 366,482.

The invention relates to safety devices for pressure systems where steam, water, air, oil or other fluids are used at high pressure.

One of the objects of the invention is to provide a simple, positive and reliable apparatus for automatically limiting the pressure in the pressure system to any desired degree.

A further object of the invention is to provide an automatic, pressure-releasing valve associated with an electric control for stopping the drive of a motor forming the motive power for generating the pressure or for actuating an electrically controlled device for relieving the pressure.

The invention further consists in the several features hereinafter set forth and more particularly defined by the claim at the conclusion hereof.

In the drawing Fig. 1 is a vertical sectional view through a safety device embodying the invention;

Fig. 2 is a plan view of the device with the cover cap removed;

Fig. 3 is a diagrammatic view of a pressure system in connection with which the device may be used.

Referring to the drawing the numeral 5 designates a casing which may be part of a pressure pump body or a fitting in a pressure line in which the pressure fluid is conducted by a pipe 6 to a passage 7.

A valve seat member 8 is removably fitted into a bore 9 communicating with the passage 7 with a suitable sealing gasket 10 interposed between it and a seat 11 and is firmly held against its seat 12 by a tubular plug 13 having threaded engagement with the threaded portion of the bore 9. The seat member has a bore 14 extending therethrough and preferably a conically-shaped seat 15 at its outer end.

A needle or poppet valve 16 is fitted to slide freely in the bore of the plug 13 and is provided with longitudinally extending grooves 17 for the ready passage of the pressure fluid to a chamber 18.

A housing member 19 is securely mounted upon the casing 5 by bolts 20 and contains all of the valve operating or controlling mechanism. This housing is provided with a bore 21 communicating with the chamber 18 and having a by-pass or overflow passage 22 leading therefrom.

A spring seat plug 23 is slidably mounted in the housing member 19 and is held in engagement with the stem of the valve 16 by a heavy spring 24 interposed between said plug and a spring seat plug 25. Pressure is placed on the spring 24 by a screw plug 26 which is adjustably mounted in the reduced threaded bore 27 in said housing and engages the plug 25.

The plug 23 has passages 28 therein for the ready passage of pressure fluid past said plug and the plug 26 has a wrench-engaging portion or polygonal end 29 and is held in adjusted position by a locknut 30. The end 29 and nut 30 are located above the upper end of the housing so that they are readily accessible for adjustment.

With this construction the tension of the spring 24 is set to hold the valve 16 closed under all normal working pressure conditions in the pressure system. When, however, this pressure is exceeded the excess pressure overcomes the action of the spring 24 and lifts the valve 16 and allows the pressure fluid to escape from the system, thereby reducing the pressure in the system and thereby, in most cases, overcoming any danger or possible damage incident to such excessive pressures.

However, to further insure against damage due to excessive pressure the device is provided with a safety electric control. For this purpose the plugs 25 and 26 have alined bores 31 and 32 in which a rod 33, bearing at its lower end on the plug 23, is mounted. This rod extends upwardly through a block 34 of insulating material secured to a supporting sleeve 35 having threaded engagement at 36 with the housing and abuts against a block or button 37 of insulating material movably mounted in a recess 38 in said block 34.

A spring contact 39 is secured to the block 34 by a terminal screw 40 and its free end extends over the button 37. A spring contact 41 is secured to the block 34 adjacent a washer 42 by a terminal screw 43 and its free end extends over the free end of the contact 41 and in the path of movement thereof.

With this arrangement when the valve 16 is lifted, as previously described, the plug 23 and rod 33 are likewise lifted and the rod 33 thus moves the button 37 outwardly together with the free end of the contact 39 which thus moves into circuit closing relation with the contact 41 and thus closes a control circuit that operates, for example, as shown in Fig. 3, a coil 45 of a relay switch 46 which thus opens this switch and thereby opens the power circuit of a motor 47 which is supplying the power for driving the pump 48, thus stopping said motor and any further action of the pump. A top cover 49 has a sliding fit on the block 34.

I desire it to be understood that this invention is not to be limited to any particular form or arrangement of parts except in so far as such limitations are included in the claim.

What I claim as my invention is:

In a safety device for pressure systems, the combination with a pressure line, of a casing provided with a valve-controlled relief passage, a needle valve controlling said passage, a housing secured to said casing, a spring mounted in said housing, spring seat plugs engaged by said spring, one of said plugs engaging said valve, a tension-adjusting plug in threaded engagement with said casing and engaging said other spring seat plug, said last-named plug and tension adjusting plug having alined bores, a switch-operating rod passing through said bores and engaging said other spring seat plug, said rod also projecting beyond the casing.

In testimony whereof, I affix my signature.

WILLIAM C. DENNIS.